June 19, 1962 — R. O. SAXTON — 3,039,191
UTILITY SHEARS
Filed Dec. 13, 1960
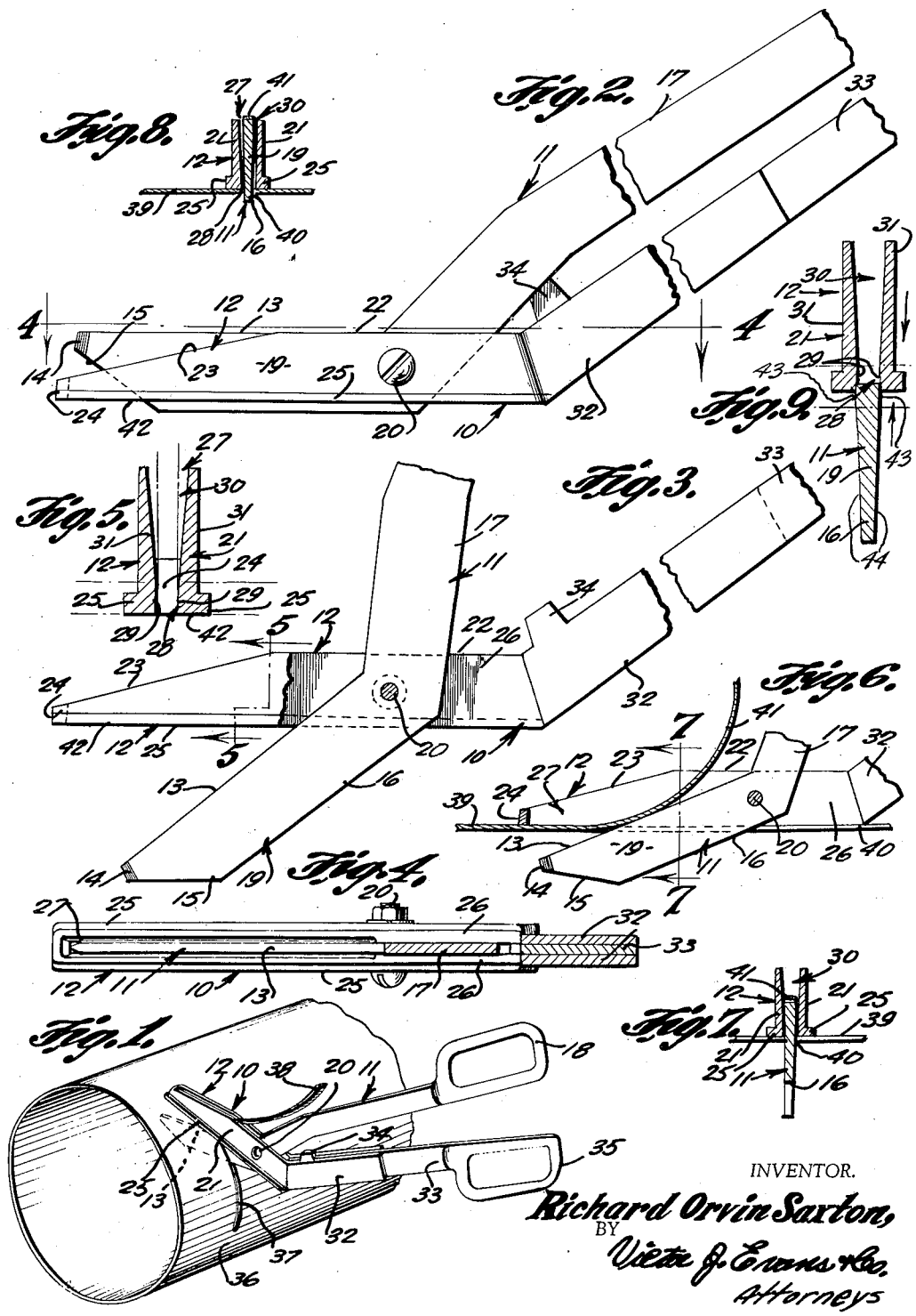
INVENTOR.
Richard Orvin Saxton,
BY Victor J. Evans & Co.
Attorneys

United States Patent Office 3,039,191
Patented June 19, 1962

3,039,191
UTILITY SHEARS
Richard Orvin Saxton, Rte. 1, Custer, Mich.
Filed Dec. 13, 1960, Ser. No. 75,632
2 Claims. (Cl. 30—258)

This invention relates to shears, and more particularly to shears of the type that include a pair of members that are pivotally connected together, and wherein one of the members comprises a single blade while the other member comprises or includes a double blade.

The primary object of the invention is to provide shears which will effectively and efficiently cut various material such as metal, plastic substances or the like, and wherein an article such as a tube can be readily split or cut crosswise without being bent out of shape.

A still further object is to provide utility shears which can be used for effectively cutting material of different shapes as for example the utility shears of the present invention can be used for cutting both round and square eaves trough material without distortion or bending thereof.

A further object of the invention is to provide utility shears which are extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a perspective view illustrating the utility shears of the present invention being used for cutting material such as a round piece of pipe.

FIGURE 2 is a fragmentary side elevational view of the utility shears of the present invention showing the shears in closed position.

FIGURE 3 is a fragmentary side elevational view similar to FIGURE 2 but showing the members in open position, and with parts broken away.

FIGURE 4 is a sectional view taken on the line 4—4 of FIGURE 2.

FIGURE 5 is an enlarged sectional view taken on the line 5—5 of FIGURE 3.

FIGURE 6 is a fragmentary elevational view showing a flat piece of material being cut and showing the parts in an intermediate position before the cutting is completed.

FIGURE 7 is a sectional view taken on the line 7—7 of FIGURE 6.

FIGURE 8 is a view generally similar to FIGURE 7 but showing the blades in closed position and in a position after the cut has been completed.

FIGURE 9 is a fragmentary sectional view showing the blades in a position as for example just at the beginning of the cutting action.

Referring in detail to the drawings, the numeral 10 indicates the utility shears of the present invention which comprise first and second members 11 and 12 that are pivotally connected together as at 20. The first member 11 is of uniform thickness throughout its length in a longitudinal direction, but is tapered otherwise, and the first member 11 includes a single blade 19 which has a straight upper edge 13 as well as a blunt tip 14, and the blade 19 further includes an inclined lower front edge 15, and a straight bottom edge 16.

The first member 11 further includes a lever portion 17 which terminates in a hand grip 18, FIGURE 1.

The second member 12 is shaped to comprise a pair of spaced apart blades 21 which have rearwardly disposed upper straight edges 22, and forwardly disposed downwardly inclined edge portions 23, and the pair of blades 21 are joined at their front end by a connecting portion 24. The numeral 25 indicates longitudinally extending flanges which extend outwardly from the lower edges of the pair of blades 21, for a purpose to be later described.

As shown in FIGURE 4 there is provided diametrically opposed inwardly directed shoulders 26 on the inner rear portions of the blades 21.

Referring to FIGURE 5 of the drawings for example, it will be seen that the space between the pair of blades 21 is indicated generally by the numeral 27, and these blades 21 are shaped or arranged so that the lower portion 28 of the space 27 is of uniform size and the lower portion of the space is defined by spaced parallel lower surfaces 29 on the inside of the blades 21. Above the lower portion 28, there is defined or provided upwardly and outwardly flaring surfaces 31 which define a tapering or flaring clearance space 30.

Angularly arranged sections 32 are arranged at the rear portions of the blades 21, and the numeral 33 indicates a lever which has a portion thereof suitably secured between the angularly arranged sections 32, and a lug 34 is suitably affixed to the member 12 in order to define a stop element for limiting pivotal movement of the members 11 and 12. The lever 33 terminates in a hand gripping portion 35, FIGURE 1.

Referring to FIGURE 1 of the drawings, the numeral 36 indicates a round article such as a piece of pipe being cut by the shears of the present invention and the numeral 37 indicates a cut being made in the member 36, and the strip of material removed from the cut is indicated by the numeral 38.

In FIGURES 6, 7 and 8 the numeral 39 indicates a flat piece of material being cut by the shears of the present invention and the cut which is formed is indicated by the numeral 40, and the strip removed during the cutting operation is indicated by the numeral 41.

From the foregoing, it is apparent that there has been provided utility shears which are especially suitable for use in cutting various types of articles or materials, and with the parts arranged as shown in the drawings, it will be seen that the portions 18 and 35 are adapted to be conveniently gripped in the hands of the user and by moving the blades from an open position such as that shown in FIGURE 3 to a closed position such as that shown in FIGURE 2, material between the blades can be effectively cut or severed. The lower surface of the blades 21 are flat as indicated by the numeral 42, and the blade 19 has the upper straight or flat edge 13.

As shown in FIGURE 1 the shears 10 of the present invention can be used for cutting a round or cylindrical member 36 which may be a stove pipe or the like, and in FIGURE 1 the cut being made is indicated by the numeral 37 and the strip of material removed during the formation of the cut is indicated by the numeral 38.

In FIGURES 6, 7 and 8 the shears of the present invention are shown being used cutting a flat piece of material 39 so as to form a cut 40, and in these views the numeral 41 indicates the strip of material that is removed during the formation of the cut 40. In FIGURE 6 the cut is not yet completed, and the view shown in FIGURE 7 corresponds to that shown in FIGURE 6, while in FIGURE 8 the blades are shown in position after the cut has been finished or completed. The blade 19 is adapted to move between the pair of plades 21, and as shown in the drawings, the blade 19 includes an upper portion 43 of uniform thickness, and the blade 19 further includes a lower portion 44 which has a somewhat tapered formation. That is, the side surfaces of the blade 19 in the vicinity of the upper portion thereof as indicated by the numeral 43 are arranged at right angles with respect to its cutting edge 13. The lower surfaces as indicated by the numeral 44 have a somewhat inwardly tapered arrangement, and this construction is such that the cutting action can take place between the portions 43 and 29, and due to the provision of the tapered portion 44 and tapered portion 30, there will be increased or sufficient clearance to permit the material that has been cut to be readily discharged or ejected from the tool of the present invention. The pair of blades 21 are spaced from each other so as to provide a clearance space 27, and as shown in FIGURE 5 for example, this clearance space is such that the lower portion thereof as indicated by the numeral 28 is straight or uniform in size, while the portion 30 above the portion 29 tapers outwardly. This construction is such that the necessary cutting action can take place as the blade 19 enters the lower portion 28, as for example as shown in FIGURES 6 and 7, and then due to the provision of the tapering or flaring space 30, the space 30 will provide sufficient clearance to permit the strip of material such as the strip 38 or 41 to be readily ejected or pushed out through the tapering space 30 as the cut is being made.

The pair of members 11 and 12 are pivotally connected together as at 20. It is to be noted that the member 12 is provided with the inwardly disposed thickened portions or shoulders 26 that are arranged so that their inner surfaces are in spaced parallel relation with respect to each other, and the clearance space between the shoulders 26 does not include a tapering surface such as that indicated by the numeral 30. Thus, with the inner surfaces of the shoulders 26 in spaced parallel relation with respect to each other, the member 11 will be held in its proper aligned position since the shoulders 26 are spaced so that wobbling or movement of the blade 11 out of its proper position will be prevented.

The lug 34 functions as a stop member so as to limit closing or pivotal movement of the members 11 and 12, as for example as shown in FIGURE 2. The outwardly directed flanges 25 on the blades 21 help strengthen the blades 21 and in addition these outwardly directed flanges 25 provide increased bearing surface to bear against the article being cut such as the article 36 or the article 39 so that there will be less of a tendency for these articles to become bent or pushed out of a shape while the shears are being used on the articles to form a cut therein.

The parts can be made of any suitable material and in different shapes or sizes.

The end of the single blade 19 is blunt as indicated by the numeral 14. The utility shears are provided with the finger loops 18 and 35 as for example as shown in FIGURE 1.

The present invention will cut various types of material such as a flat material and bending of such material will be prevented, and also laminated plastic materials, flat sheets of metal and the like can be cut without bending thereof. The shears of the present invention have blades that are perfectly straight along the cutting edges, square on the end and the shears of the present invention will readily cut various types of materials and can be used for cutting around a sheet metal pipe or tube, and it can also be used for cutting material spirally or lengthwise, and it can be used for cutting off waste at any point so as to leave a cut with straight smooth edges. The shears will cut round, square or solid material such as conductors, and pipes can be cut crosswise, spirally or lengthwise, and flat sheets of metal or plastic can be cut, and in addition floor covering and the like can be readily cut, and breakage or bending of the material will be prevented. The tip 14 of the single blade 19 permits the waste material to be cut off at any length, and the bolt 20 functions as a pivot for the blades. The clearance 30 is to permit the waste material to be readily ejected from the shears, and the flanges 25 provide increased strength.

The parts are arranged so that sharpening of the shears can be readily accomplished when desired or required, and the single blade 19 has the top edge 13 which is straight and this straight edge 13 functions as the cutting edge. The single blade includes the upper cutting edge 13 as well as the upper portion 43 that is not tapered, and the single blade includes the lower portion 44 that is slightly tapered, and the space between the double blades is such that the lower portion 28 is of uniform size, while the upper portion 30 is of flaring or tapering shape or size. The shears are constructed so that when the handle is closed against the stop 34, the single blade 19 will automatically clear all of the waste from the double blades 21.

It is to be noted that the shears of the present invention can be used for various purposes such as for splitting a tube or cutting it crosswise without bending it out of shape, and on flat work the handles are both above the material making it easy to work and the material will lay flat. Material can be cut which is round or square such as eaves troughs of different shapes, and this material can be cut without distortion and this is possible because the single blade works between the double blades so as to cut out a strip of material, and there is provided clearance so that bending of the material out of shape will be prevented. The shears can be made in different sizes for different weights of material, and the shears can be used as right or left hand shears. In FIGURE 1 the member 36 is adapted to represent a cylinder, tin can or the like.

Minor changes in shape, size and rearrangement of details coming within the field of invention claimed may be resorted to in actual practice, if desired.

What is claimed is:

1. Utility shears comprising first and second members pivotally connected together, said first member including a blade portion having an upper section of uniform thickness and a lower section of tapering formation, and said blade portion having a straight upper edge, said blade portion further including a blunt tip, an inclined lower front edge and a straight bottom edge, said first member further including a lever portion arranged angularly with respect to said blade portion and a hand grip on an end of said lever portion; said second member comprising a pair of spaced apart blades shaped to include rearwardly disposed upper straight edges and forwardly disposed downwardly inclined edge portions, a connecting portion joining together the front ends of the blades of the second member, longitudinally extending flanges extending outwardly from the lower edges of the pair of blades of said second member, spaced apart inwardly directed shoulders on the inner rear portions of the blades of the second member, the pair of blades of the second member being arranged so that there is a space of uniform size between the lower inner portions of the pair of blades, and there being an outwardly flaring inclined clearance space above the lower space between the blades, angularly arranged sections at the rear portions of said pair of blades of said second member, a lever having a portion fixedly secured between said last named angularly arranged sections, and said last named lever having a hand grip thereon.

2. The structure as defined in claim 1 and further including a lug on said second member providing a stop member.

References Cited in the file of this patent

UNITED STATES PATENTS

| | | |
|---|---|---|
| 359,890 | Rue | Mar. 22, 1887 |
| 1,086,286 | Fyhrie | Feb. 3, 1914 |
| 1,201,106 | Shuter | Oct. 10, 1916 |
| 2,357,197 | Hood | Aug. 29, 1944 |
| 2,766,526 | Pape | Oct. 16, 1956 |
| 2,915,821 | Partin | Dec. 8, 1959 |